(12) United States Patent
Santín Navarro et al.

(10) Patent No.: US 11,878,648 B2
(45) Date of Patent: Jan. 23, 2024

(54) VEHICLE OCCUPANT RESTRAINT SYSTEM FOR A MOTOR VEHICLE AND MOTOR VEHICLE

(71) Applicant: Dalphi Metal Espana S.A., Vigo (ES)

(72) Inventors: Pedro José Santín Navarro, Vigo (ES); Maria Crespo Vizán, Valladolid (ES); Óscar Ugarte Alba, Valladolid (ES)

(73) Assignee: Dalphi Metal Espana, S.A., Vigo (ES)

( * ) Notice: Subject to any disclaimer, the term of this patent is extended or adjusted under 35 U.S.C. 154(b) by 0 days.

(21) Appl. No.: 17/610,608

(22) PCT Filed: May 13, 2020

(86) PCT No.: PCT/EP2020/063289
§ 371 (c)(1),
(2) Date: Nov. 11, 2021

(87) PCT Pub. No.: WO2020/229518
PCT Pub. Date: Nov. 19, 2020

(65) Prior Publication Data
US 2022/0212625 A1    Jul. 7, 2022

(30) Foreign Application Priority Data

May 16, 2019 (DE) .......................... 102019112861.7

(51) Int. Cl.
*B60R 21/231* (2011.01)
*B60R 21/214* (2011.01)
(Continued)

(52) U.S. Cl.
CPC ...... *B60R 21/23138* (2013.01); *B60R 21/214* (2013.01); *B60R 21/232* (2013.01);
(Continued)

(58) Field of Classification Search
CPC ............ B60R 21/23138; B60R 21/214; B60R 21/2338; B60R 2021/0048; B60R 2021/23386; B60R 2021/23161
See application file for complete search history.

(56) References Cited

U.S. PATENT DOCUMENTS 6,773,026 B2 * 8/2004 Meyer ................. B60R 21/2338
280/730.2
7,222,877 B2 * 5/2007 Wipasuramonton .........................
B60R 21/2338
280/730.2
(Continued)

FOREIGN PATENT DOCUMENTS

CN      106184103 A    12/2016
DE      10038087 A1    2/2002
(Continued)

OTHER PUBLICATIONS

Computer generated English translation of CN 106184103 (Year: 2023).*
(Continued)

*Primary Examiner* — Paul N Dickson
*Assistant Examiner* — Tiffany L Webb
(74) *Attorney, Agent, or Firm* — Kristin L. Murphy (57) ABSTRACT

The disclosure relates to a vehicle occupant restraint system for a motor vehicle, comprising a central airbag installed in the area of a vehicle roof liner between two vehicle seats. At least one holding arrangement is fastened by a first end to the airbag and by a second end to a vehicle structure such that the holding arrangement retains the airbag in an inflated state in a holding position in which the airbag can laterally support a vehicle occupant.

15 Claims, 12 Drawing Sheets

(51) Int. Cl.
  *B60R 21/232* (2011.01)
  *B60R 21/2338* (2011.01)
  *B60R 21/00* (2006.01)

(52) U.S. Cl.
  CPC .. *B60R 21/2338* (2013.01); *B60R 2021/0048* (2013.01); *B60R 2021/23146* (2013.01); *B60R 2021/23388* (2013.01)

(56) References Cited

U.S. PATENT DOCUMENTS

| | | | | |
|---|---|---|---|---|
| 7,828,322 | B2* | 11/2010 | Breuninger | B60R 21/36 |
| | | | | 280/730.2 |
| 9,493,135 | B2* | 11/2016 | Fukawatase | B60R 21/231 |
| 10,358,108 | B2* | 7/2019 | Jung | B60R 21/231 |
| 10,471,919 | B2* | 11/2019 | Faruque | B60R 21/2338 |
| 10,836,340 | B2* | 11/2020 | Obayashi | B60R 21/2338 |
| 10,981,531 | B2* | 4/2021 | Jaradi | B60N 2/143 |
| 11,186,246 | B2* | 11/2021 | Min | B60R 21/232 |

FOREIGN PATENT DOCUMENTS

| | | | |
|---|---|---|---|
| DE | 102006051464 A1 | 6/2007 | |
| DE | 602004011003 T2 | 1/2009 | |
| DE | 102009005900 A1 | 7/2010 | |
| DE | 102012216896 A1 | 3/2013 | |
| DE | 102014013649 A1 | 3/2016 | |
| DE | 102018111825 A1 | 11/2018 | |
| GB | 2362139 A | 11/2001 | |
| JP | 2016107664 A | 6/2016 | |
| JP | 2019119293 A * | 7/2019 | ............. B60R 21/23 |

OTHER PUBLICATIONS

Computer generated English translation of DE 10038087 (Year: 2023).*
Computer generated English translation of JP 2019-119293 (Year: 2023).*
International Search Report and Written Opinion for PCT/EP2020/063289 dated Jul. 27, 2020 (13 pages; with English translation).

* cited by examiner

VEHICLE OCCUPANT RESTRAINT SYSTEM FOR A MOTOR VEHICLE AND MOTOR VEHICLE

CROSS-REFERENCE TO RELATED APPLICATIONS

This application is a national stage of International Application No. PCT/EP2020/063289, filed May 13, 2020, the disclosure of which is incorporated herein by reference in its entirety, and which claimed priority to German Patent Application No. 102019112861.7, filed May 16, 2019, the disclosure of which is incorporated herein by reference in its entirety.

TECHNICAL FIELD

The disclosure relates to a vehicle occupant restraint system for a motor vehicle as well as to a motor vehicle comprising a vehicle occupant restraint system.

BACKGROUND

Vehicle occupant restraint systems are arranged to support vehicle occupants in the case of need, Depending on the type of need, different restraint systems may become active. It is a constant effort to optimize the vehicle occupant in order to protect the vehicle occupant even better in the case of need.

SUMMARY

Thus, it is an object of the invention to provide an improved vehicle occupant restraint system.

According to the disclosure, a vehicle occupant restraint system for a motor vehicle is provided, comprising a central airbag which is installed in an area of a vehicle roof liner between two vehicle seats. At least one holding arrangement is provided which is fastened by a first end to the airbag and by a second end to a vehicle structure so that the holding arrangement retains the airbag in an inflated state in a holding position in which the airbag can laterally support a vehicle occupant.

A vehicle occupant restraint system of this type offers the advantage that in the case of need the airbag is held especially reliably by the holding arrangement in a position in which it can support a vehicle occupant. For example, transverse displacements of the vehicle occupants are prevented or at least restricted by the vehicle occupant restraint system according to the disclosure. Accordingly, the airbag need not be backed by a vehicle structure, which is difficult to realize for a central airbag. In this way, moreover the geometry and the position of the airbag can be selected to be especially flexible.

In a so-called far-side collision, i.e. when a collision occurs on a vehicle side opposed to the driver side, the driver may be laterally supported especially reliably and a transversal displacement of the driver can be kept low, even if no passenger is present in the vehicle. If a passenger is present, moreover head-to-head collision can be reliably prevented.

Fastening of the airbag in the area of the roof liner is effectuated via fasteners, for example, which are disposed especially along a longitudinal edge of the airbag. The fasteners form especially several fastening points by which the airbag is fixed along the longitudinal edge in the transverse vehicle direction and in the longitudinal vehicle direction.

The fasteners are, e.g., retaining tabs fastened, and in one exemplary arrangement, sewn, to the airbag which can be fastened to a vehicle structure.

In one exemplary arrangement, the at least one holding arrangement is suited to retain the airbag in an inflated state in a position in which a principal extension plane of the airbag mainly extends in a vertical vehicle direction and/or in a longitudinal vehicle direction, Thus, the airbag need not be supported by a vehicle structure but can be held in an appropriate position exclusively via the holding arrangement. In addition, the airbag is held tensioned in an inflated state by the holding arrangement so that the airbag is especially stable. This means that in the case of load, especially in a moment load, when a vehicle occupant is supported by the airbag in the case of need, it is less easy to move the airbag out of position. The holding arrangement may produce tensile force on the airbag.

According to one exemplary arrangement, the at least one holding arrangement is a tether which is fastened by one end to the airbag and by another end to a vehicle structure. By a tether, movement of the airbag in the inflated state can be restricted at least in one direction. When the airbag is loaded in said direction while supporting a vehicle occupant, the airbag is restrained by the tether in the holding position, thus helping to restrict displacement of the vehicle occupant.

In one exemplary arrangement, a tether is understood to be both a strap, the length of which is several times larger than its width, and a fabric layer, the length and width of which are similar or the width of which may even be larger than its length.

For example, in one exemplary arrangement, the tether is connected to the airbag along a longitudinal seam which, when viewed in the longitudinal vehicle direction, extends from a leading edge of the airbag to a trailing edge of the airbag that is especially opposed to the leading edge. By such tether the airbag can be held tensioned in the inflated state along its entire length. In this way, a vehicle occupant can be supported especially reliably, even if he/she impacts, for example by his/her head, in a front or rear area of the airbag in the longitudinal vehicle direction. The vehicle occupant restraint system thus is suited to reliably support a vehicle occupant, even if he/she is in a foremost or rearmost sitting position.

In one exemplary arrangement, the tether in this case is a rectangular cutting, for example made from the same fabric as the airbag.

In one exemplary arrangement, the tether need not necessarily extend completely up to the leading edge and/or the trailing edge of the airbag, but it may as well end somewhat ahead of the leading edge and/or the trailing edge.

In accordance with another exemplary arrangement, two tethers may be provided, wherein in the inflated state of the airbag either of the tethers is fastened to the rear outer face of the airbag, when viewed in the longitudinal vehicle direction, and the other tether is fastened to an opposed front outer face of the airbag. When a body part, such as the head and/or the shoulder, of a vehicle occupant impacts on the airbag between the front end and the rear end of the airbag, when viewed in the longitudinal vehicle direction, a tensile force pulling the airbag in opposite directions and in this way holding the airbag tensioned and thus in position acts in each of the tethers. The fastening of the tethers at the front and rear outer faces of the airbag, when viewed in the longitudinal vehicle direction, further prevents the airbag from moving away while it supports a vehicle occupant.

According to one exemplary arrangement, the airbag may include, at least at its two longitudinal edges, fasteners for fastening the airbag to the roof liner so that the airbag is U-shaped in the mounted and inflated state. In other words, the airbag may have two compartments that are juxtaposed when viewed in a front view. In this way, the airbag in the inflated state has an increased inherent stiffness and thus improved restraining behavior in the case of need.

In one exemplary arrangement, the fasteners serve at the same time as a holding arrangement, as the fasteners in this exemplary arrangement are suited to retain the airbag in the holding position.

In particular, the airbag has two compartments of different thickness in the inflated state. The thickness extends in the transverse vehicle direction. One of the two compartments, especially the narrower compartment, is provided to support a body part, especially the driver's head. The further compartment, especially the thicker one of the two compartments, is configured to effectuate a supporting force acting opposite to the displacement of the vehicle occupant in the case of need.

In one exemplary arrangement, it is also possible to provide the compartments with equal thickness so that in the inflated state the airbag is symmetric in the inflated state when viewed in the front view, unless any lateral forces act upon the airbag.

In accordance with one exemplary arrangement, the airbag has a tensioning strap extending between a front end and a rear end of the airbag in the longitudinal vehicle direction and by its ends being fastened to the airbag, the length of the tensioning strap being shorter than a length of the airbag in the longitudinal vehicle direction so that deployment of the airbag is restricted by the tensioning strap such that the airbag in the inflated state is U-shaped or V-shaped in a top view. The length of the airbag in this case is meant to be the length which the airbag would have in the inflated state, unless deployment was limited by the tensioning strap.

Due to the tensioning strap, the airbag in the inflated state can better adapt to a body contour of a vehicle occupant. In addition, the U shape or V shape enables the airbag to support the vehicle occupant to a certain degree even in the longitudinal vehicle direction, as soon as a body part such as the head or the shoulder of the vehicle occupant is located between the panels of the U-shaped or V-shaped airbag extending at angles relative to each other.

In one exemplary arrangement, a length of the airbag extending in the vertical vehicle direction in the inflated state is so long that the airbag is suited to laterally support the head of a vehicle occupant and especially a torso of the vehicle occupant. In this way, a body of a vehicle occupant can be supported especially extensively in the case of need.

However, it is also imaginable that the airbag merely supports the head of the vehicle occupant. In this exemplary arrangement, additionally a side airbag integrated in the seat may be provided to support a torso of the vehicle occupant.

In one exemplary arrangement, a tether fastened to a rear outer face of the airbag may extend rearward, starting from the airbag, in the longitudinal vehicle direction and another tether fastened to a front outer face of the airbag may extend forward starting from the airbag in the longitudinal vehicle direction. In this way, the tethers may extend relative to the airbag in parallel or at an obtuse angle, when the airbag is in the inflated state. Such extension of the tethers may help to hold the airbag especially properly tensioned, in particular when a body of a vehicle occupant is displaced toward the airbag between the ends of the tethers fastened to the airbag.

According to another exemplary arrangement, a tether fastened to a rear outer face of the airbag extends rearward starting from the airbag in the longitudinal vehicle direction and another tether fastened to a front outer face of the airbag extends equally rearward starting from the airbag in the longitudinal vehicle direction. Said extension of the tethers is especially suited for vehicles having roof cutouts, as it is the case in panoramic roofs, for example, when the front vehicle roof area includes no appropriate fastening options for a tether.

In one exemplary arrangement, the vehicle occupant restraint system includes a side curtain airbag in addition to the airbag. Thus, a vehicle occupant may be supported especially reliably in both directions during lateral displacement.

In accordance with the disclosure, by a motor vehicle comprising a vehicle occupant restraint system that is designed as afore-described, wherein the motor vehicle has two juxtaposed vehicle seats, especially front seats, and the airbag in an inflated state is disposed as central airbag between the two vehicle seats. In a motor vehicle of this type, a vehicle occupant can be supported especially reliably in the case of need.

BRIEF DESCRIPTION OF DRAWINGS

Further advantages and features of the disclosure will be apparent from the following description and from the attached drawings which are referred to, wherein:

FIG. 6 shows the airbag of FIG. 5 in an inflated state, FIG. 7 schematically shows part of a further motor vehicle according to the disclosure comprising a vehicle occupant restraint system according to the disclosure in a front view, FIG. 8 schematically shows part of the motor vehicle of FIG. 7 in a top view, FIG. 9 schematically shows part of the motor vehicle of FIGS. 7 and 8 in a top view, with sitting positions of the vehicle occupants differing in a longitudinal vehicle direction, FIG. 10 schematically shows part of the motor vehicle of FIGS. 7 to 9, with the airbag being in the inflated state, FIG. 11 schematically shows part of the motor vehicle of FIGS. 7 to 10, with the airbag being in the inflated state and the sitting positions of the vehicle occupants differing in the longitudinal vehicle direction, FIGS. 12 and 13 schematically show part of a further motor vehicle 10 according to the disclosure comprising a vehicle occupant restraint system according to the disclosure.

DETAILED DESCRIPTION

Figure 1:
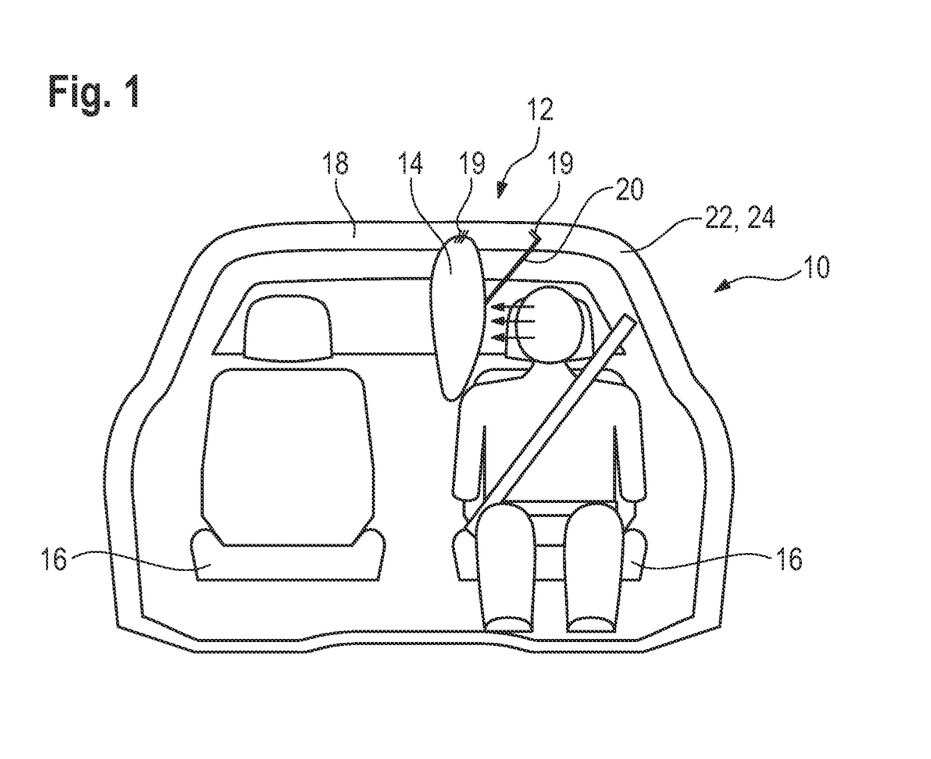
FIG. 1 shows a partial view of a motor vehicle according to a first exemplary arrangement of the disclosure comprising a vehicle occupant restraint system according to the disclosure in a front view.

FIG. 1 illustrates a motor vehicle 10 according to the disclosure comprising a vehicle occupant restraint system 12 according to the disclosure.

The vehicle occupant restraint system 12 includes an airbag 14 which in an inflated state, as illustrated in FIG. 1, is arranged as a central airbag between two vehicle seats 16, especially front seats of the motor vehicle.

The airbag 14 is installed in an area of a vehicle roof liner 18 of the motor vehicle 10 between the two vehicle seats 16.

In this way, a vehicle occupant may be supported by the airbag 14 in the event of side impact, especially during a so-called far-side collision. If a passenger is present, moreover head-to-head collision can be prevented.

The airbag 14 is fastened to the roof liner 18 by fasteners 19. The fasteners 19 help to fix the airbag 14 along a longitudinal edge in the longitudinal vehicle direction and in the transverse vehicle direction. In one exemplary arrangement, the fasteners 19 are, for example, retaining tabs that may be fastened to a vehicle structure 22.

In the case of need, the airbag 14 inflates so as to provide appropriate restraint for the vehicle occupant or, resp., occupants in a holding position.

In order to retain the airbag 14 in its holding position, when the airbag 14 is in the inflated state, a holding arrangement 20 is provided. The latter is fastened by a first end to the airbag 14 and by a second end to the vehicle structure 22.

The position of the mounting of the holding arrangement 20 on the airbag 14 may be flexibly selected depending on a shape and/or positioning of the airbag 14.

In the shown example arrangement, the holding arrangement 20 is a tether 24, and in one particular arrangement, in the form of a rectangular fabric cutting.

The tether 24 is fastened to the vehicle structure 22 equally by fasteners 19, for example.

If the vehicle occupant is displaced in a transverse vehicle direction in the case of need, as illustrated by arrows in FIG. 1, the airbag 14 may restrict the displacement of the vehicle occupant. In so doing, the airbag 14 is held under tension by the holding arrangement 20. In particular, the holding arrangement 20 applies tensile force retaining the airbag 14 in a desired position to the airbag 14. The tensile force acts opposite to a displacing force produced by the backing of a vehicle occupant which equally acts upon the airbag 14.

The holding arrangement 20 is fastened to the airbag 14, in the example arrangement shown in FIG. 1, in the upper half of the airbag 14, when viewed in the vertical vehicle direction. In this way, the vehicle occupant is ensured, in the case of need, to directly impact on the airbag 14 and is prevented from interacting with the holding arrangement 20 during lateral displacement.

At the same time, mounting of the holding arrangement 20 on the airbag 14 is spaced somewhat apart from an upper edge of the airbag 14 so that the airbag 14 can be held in position in an especially stable manner. More specifically, the holding arrangement 20 is fastened to the airbag 14 in the exemplary arrangement shown in FIG. 1 approximately level with an upper head end of a vehicle occupant, if the latter is located in his/her usual sitting position.

Figure 2:
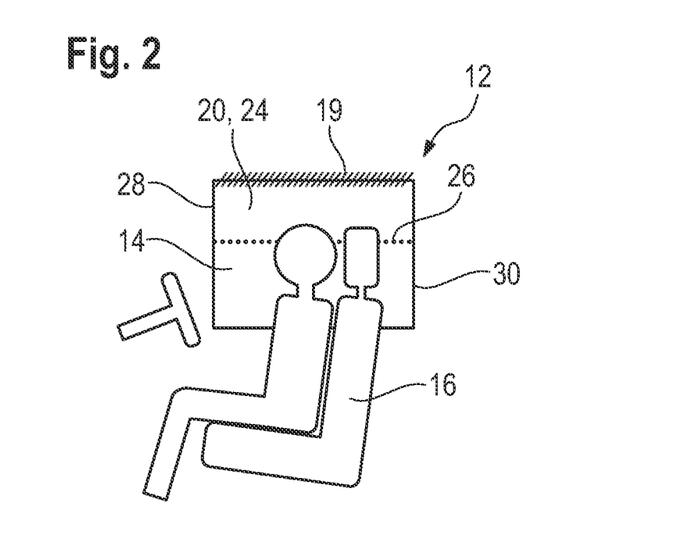
FIG. 2 shows the vehicle occupant restraint system of FIG. 1 in a side view.

The tether 24 is connected, as is evident from FIG. 2, to the airbag 14 along a longitudinal seam 26 which extends from a leading edge 28 of the airbag 14 to a trailing edge 30 of the airbag 14 when viewed in the longitudinal vehicle direction. In this way, the vehicle occupant can be reliably supported, even if he/she adopts different sitting positions, viz. adjusts the vehicle seat in the longitudinal vehicle direction. That is to say, the tether 24 prevents the airbag 14 from moving away, especially about an axis of rotation in parallel to a vertical vehicle axis and/or to a longitudinal vehicle axis when a torque is applied to the airbag 14 by the backing of the vehicle occupant.

From FIGS. 1 and 2 it is further evident that in the inflated state the airbag 14 is held by the holding arrangement 20, and in one specific exemplary arrangement, by the tether 24, in a position in which a principal extension plane of the airbag 14 mainly extends in the vertical vehicle direction and in the longitudinal vehicle direction.

Since the airbag 14 illustrated in FIGS. 1 and 2 substantially extends in a plane, it is referred to as 2D geometry of the airbag 14 in this context.

In the vertical vehicle direction, the airbag 14 is dimensioned so that it may support a head and a shoulder of the vehicle occupant. Alternatively, the airbag 14 may protrude even further downward in the vertical vehicle direction to equally support a torso of the vehicle occupant.

It is also conceivable, however, for the airbag 14 to be dimensioned such that it can support merely a head of a vehicle occupant. In this exemplary arrangement, additionally a side airbag integrated in the seat may be provided for supporting the torso of the vehicle occupant. Said side airbag is not shown in the figures for the sake of clarity, but airbags of this type are sufficiently known.

In the longitudinal vehicle direction, the airbag 14 is dimensioned such that it can reliably support a vehicle occupant even if the vehicle occupant is in a foremost or rearmost sitting position when viewed in the longitudinal vehicle direction.

Figure 3:
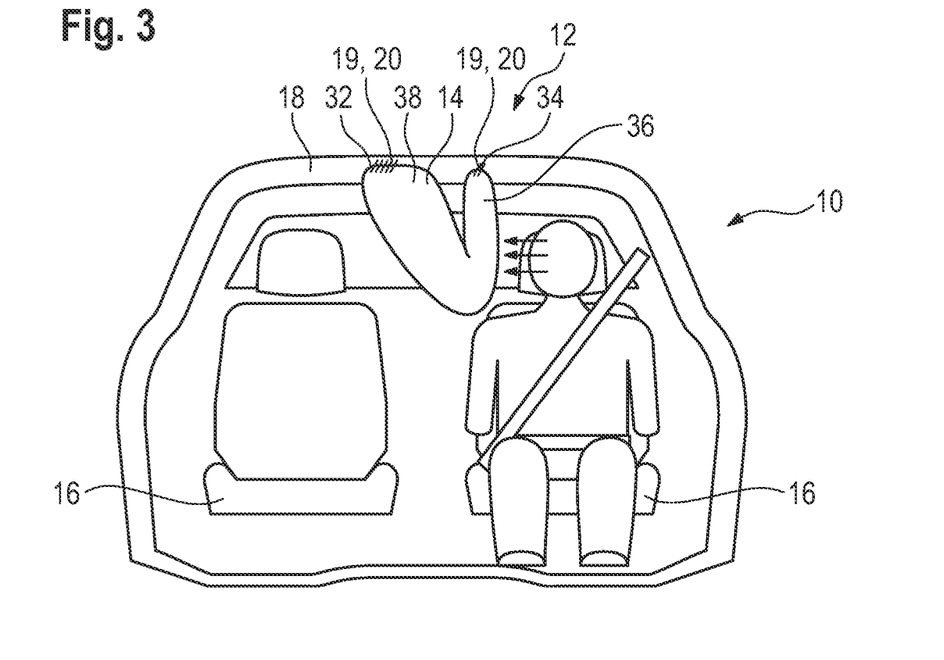
FIG. 3 shows a partial view of a motor vehicle according to the disclosure in accordance with another exemplary arrangement according to the disclosure comprising another vehicle occupant restraint system according to the disclosure in a front view.

FIG. 3 partly illustrates another exemplary motor vehicle 10 according to the disclosure comprising a vehicle occupant restraint system 12 according to the disclosure.

For like structures having like functions that are known from the foregoing disclosure hereinafter like reference numerals are used and, in so far, the preceding explanations shall be referred to, wherein hereinafter the differences of the respective arrangements will be discussed in order to avoid repetitions.

The airbag 14 according to the arrangement shown in FIG. 3 is fastened to the roof liner 18 at its two longitudinal edges 32, 34 by fasteners 19 so that the airbag 14 is U-shaped or, resp., V-shaped in the mounted inflated state. The longitudinal edges 32, 34 are the edges of the airbag 14 extending in the longitudinal vehicle direction in the mounted state of the airbag 14.

The airbag 14 includes two compartments 36, 38 which are juxtaposed when viewed in a front view. The compartments 36, 38 may be delimited against each other by a bend in the airbag 14.

The compartment 36 facing the vehicle occupant is suited to directly support a head of a vehicle occupant. In the case of need, the further compartment 38 produces a backing force which acts opposite to the displacement of the vehicle occupant and in this way assists the airbag 14 in being held in a desired position.

In one exemplary arrangement, the compartments 36, 38 have different thicknesses when viewed in the transverse vehicle direction. However, it is also possible to design the compartments 36, 38 to be of equal thickness so that the airbag 14 is symmetric when viewed in a front view.

The fasteners 19 in this exemplary arrangement simultaneously constitute the holding arrangement 20, as the airbag 14 can be retained in the holding position by fastening the airbag 14 along the longitudinal edges 32, 34.

Figure 4:
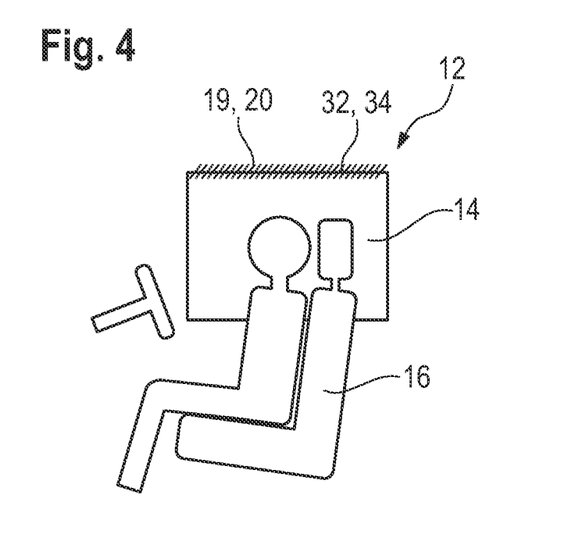
FIG. 4 shows the vehicle occupant restraint system of FIG. 3 in a side view.

FIG. 4 illustrates the vehicle occupant restraint system 12 of FIG. 3 in a side view.

Figure 5:
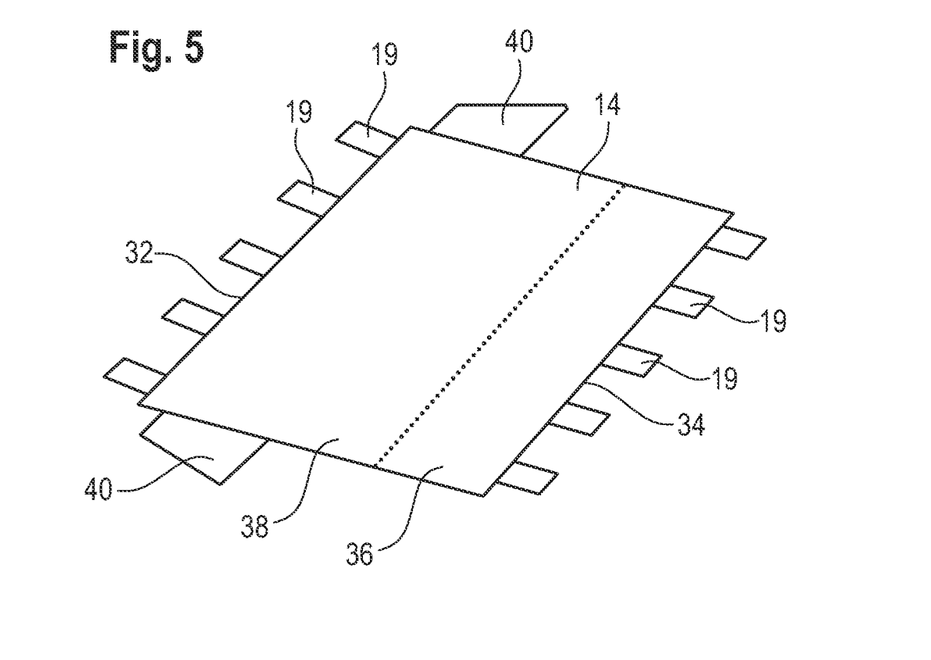
FIG. 5 shows the airbag of the vehicle occupant restraint system of FIG. 4 in a flatly spread and not inflated state.

FIG. 5 illustrates the airbag 14 of the vehicle occupant restraint system 12 shown in FIGS. 3 and 4 in an uninflated and flatly spread state.

Apart from the fasteners 19 already shown in FIGS. 3 and 4 which are disposed along the longitudinal edges 32, 34 of the airbag 14, in FIG. 5 further fasteners 40 are shown which are optionally disposed at an axially front end and an axially rear end of the airbag 14 to fasten the airbag 14 in the mounted state in the axial direction to the vehicle structure 22.

Figure 6:
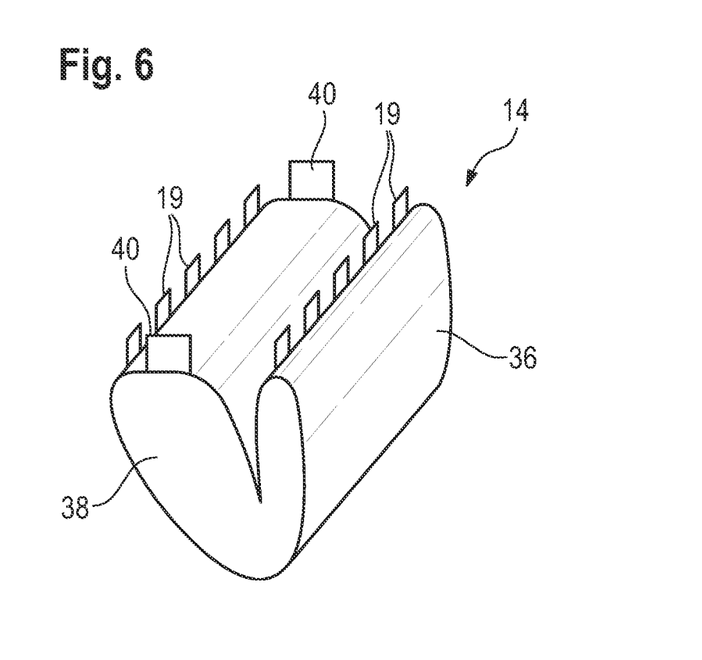

FIG. 6 illustrates the airbag 14 of FIG. 5 in the inflated state. In this representation of the airbag 14, it is clearly shown that the airbag 14 is stabilized in the case of need by the fasteners 19, 40 such that, when being loaded, the airbag 14 cannot or can only slightly rotate about an axis of rotation extending in parallel to the vertical vehicle axis.

By way of FIGS. 3 and 6 it becomes further clear that the airbag 14 in the inflated state extends in all of the three main directions, viz. in the longitudinal vehicle direction, the vertical vehicle direction and the transverse vehicle direction. Therefore, it is referred to as 3D geometry of the airbag 14 in this context.

In the arrangement according to FIGS. 3 to 6, an inflator for inflating the airbag 14 is assigned, for example, to either of the two compartments 36, 38, for example at least partly arranged within the same and especially fastened to the roof liner 18.

Figure 7:
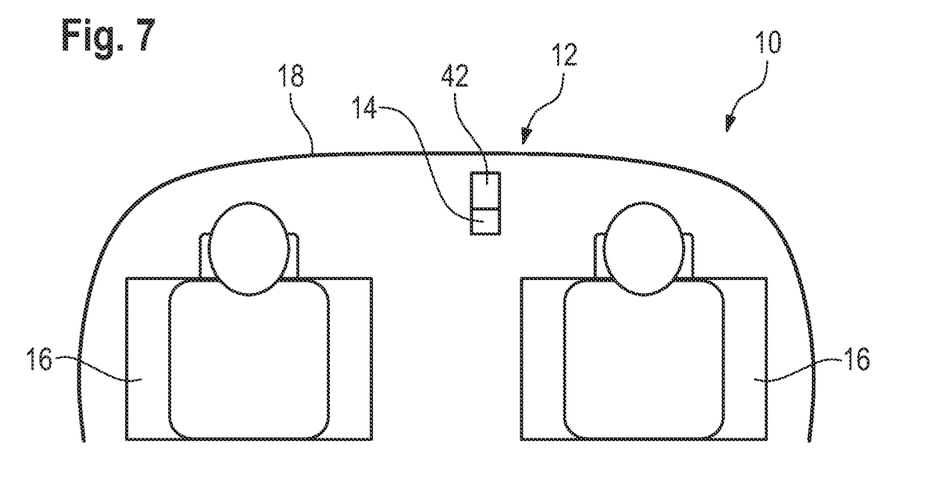

FIG. 7 schematically shows another motor vehicle 10 according to the disclosure comprising a vehicle occupant restraint system 12 in a front view.

In FIG. 7 also an inflator 42 of the vehicle occupant restraint system 12 is shown which serves for inflating the airbag 14. In one exemplary arrangement, the inflator 42 is equally fastened in the area of the roof liner 18.

Figure 8:
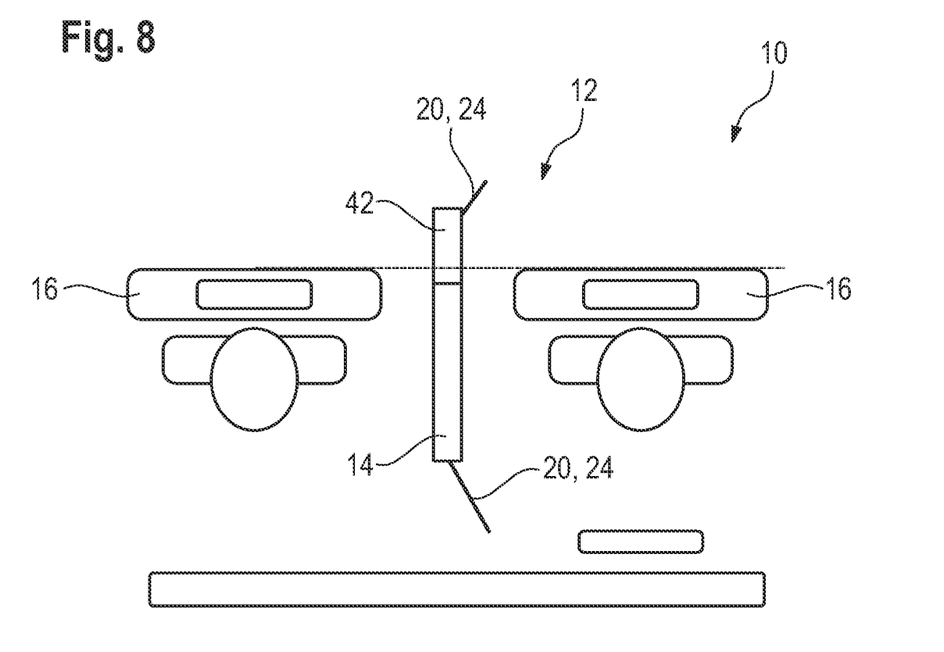

FIG. 8 illustrates the motor vehicle 10 of FIG. 7 in a top view. In this view, it is evident that a tether 24 fastened to a rear outer face of the airbag 14 extends rearward in the longitudinal vehicle direction starting from the airbag 14. Another tether 24 that is fastened to a front outer face of the airbag 14 extends forward in the longitudinal vehicle direction starting from the airbag 14. Moreover, both tethers 24 extend toward the same lateral vehicle side, for example the driver side.

When the airbag 14 is inflated, it can be held under tension by the two tethers, as the tethers 24 apply respective tensile forces acting in opposite directions to the airbag 14.

Figure 9:
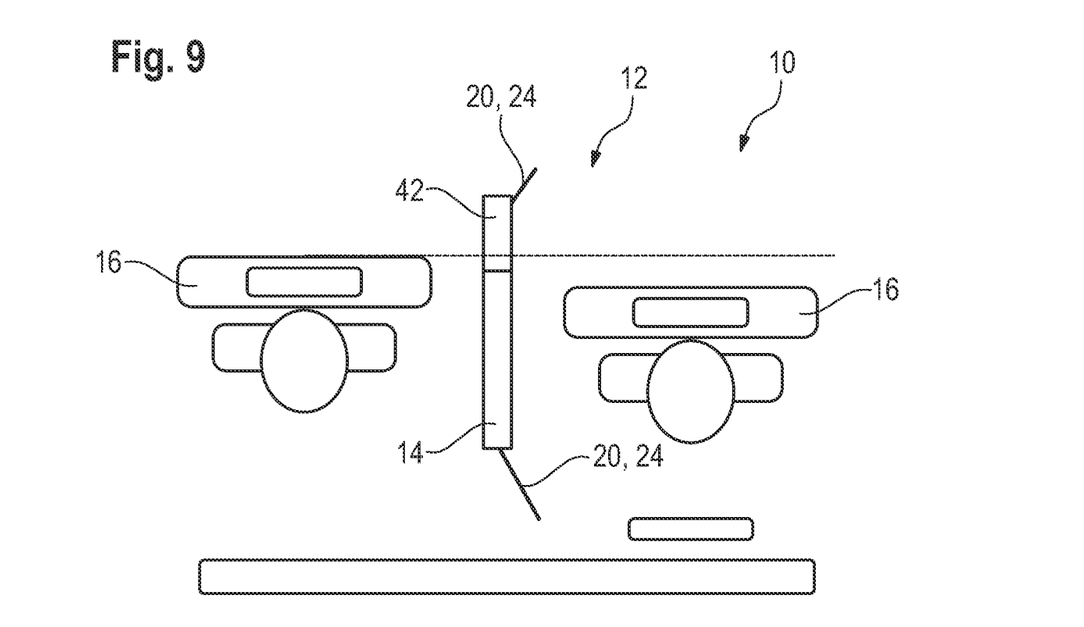

FIG. 9 illustrates the motor vehicle 10 of FIG. 8, with the exemplary arrangement shown in FIG. 9 merely differing from the representation shown in FIG. 8 by the sitting position of the driver. FIGS. 8 and 9 are intended to illustrate that the airbag 14 is dimensioned in the longitudinal direction of the motor vehicle 10 such that both in equal and in different axial sitting positions of the driver and the passenger the vehicle occupants can be reliably supported.

Figure 10:
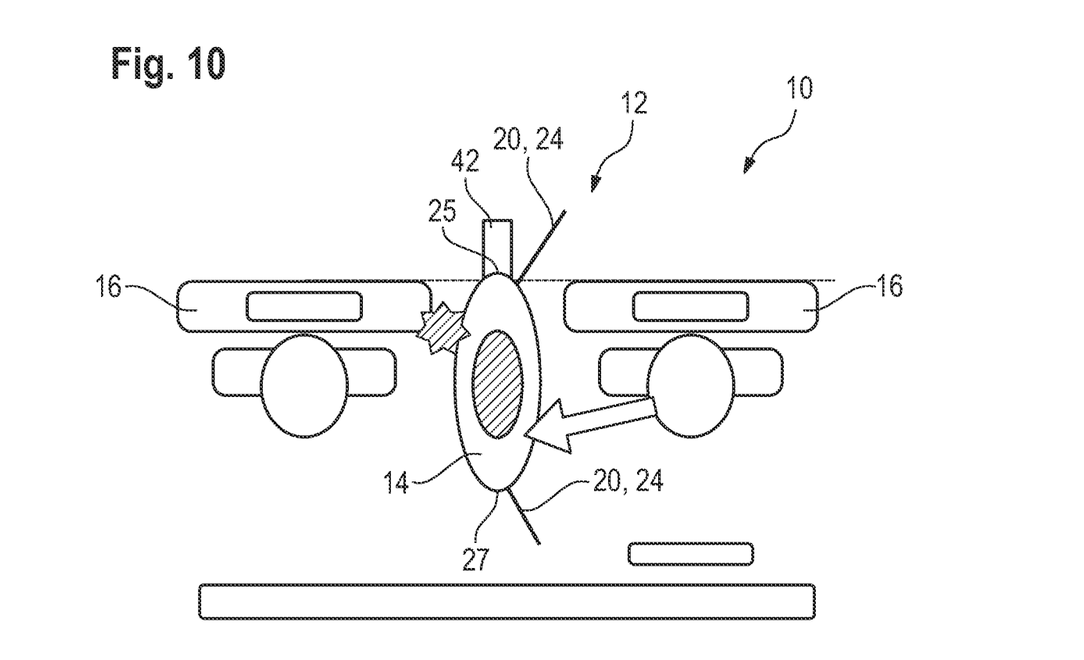
Figure 11:
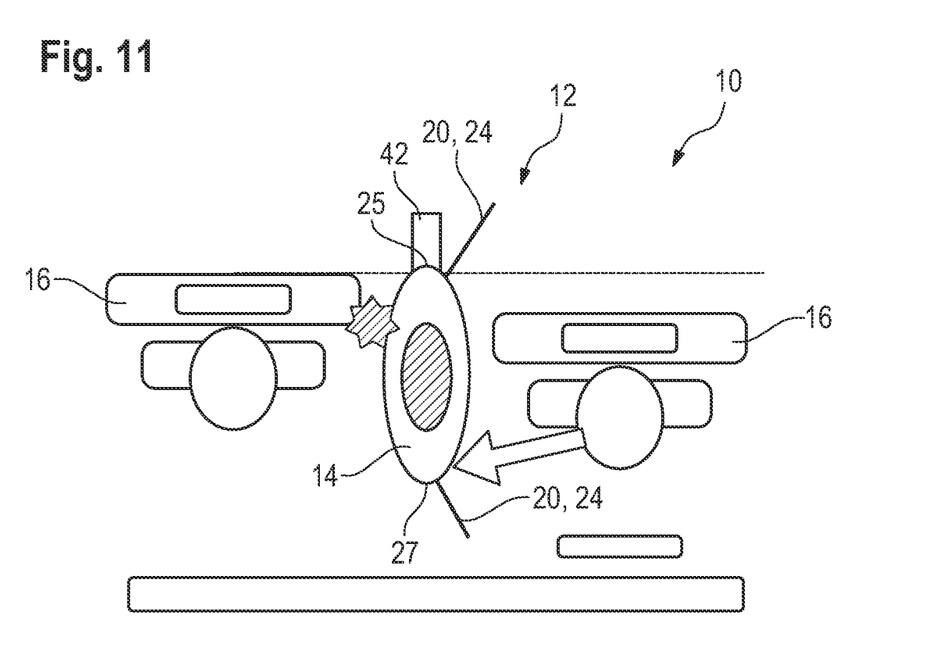

Each of the FIGS. 10 and 11 shows the motor vehicle 10 of FIGS. 7 to 9, with the airbag 14 being shown in the inflated state. In the exemplary arrangement shown in FIG. 10, the driver and the passenger are in an axially equal sitting position and in FIG. 11 they are in axially different sitting positions.

In the inflated state of the airbag 14, one of the tethers 24 is fastened to a rear outer face 25 of the airbag 14 when viewed in the longitudinal vehicle direction. The further tether 24 is fastened to an opposed front outer face 27 of the airbag 14. Since the airbag 14 illustrated in the figures takes an oval shape in the top view, the front and rear outer faces 25, 27 are smoothly transformed into the side panels of the airbag 14.

The airbag 14 in the inflated state may contact the roof liner 18 at least in areas, which is illustrated in each of the figures by way of a hatched area. In addition, the airbag 14 may contact a vehicle seat 16, which is illustrated in each of the figures by a star. Said contact may contribute to orienting the airbag 14 as quickly as possible in a desired holding position in the case of need.

Said contact cannot be understood to be a specific structural support of the airbag 14, however. The specific support is primarily effectuated by the holding arrangement 20.

In FIGS. 10 and 11, an expected trajectory of the driver's head in a far-side collision is illustrated by way of an arrow. Despite different axial sitting positions of the driver, the driver's head can be reliably supported by the airbag 14.

Figure 12:
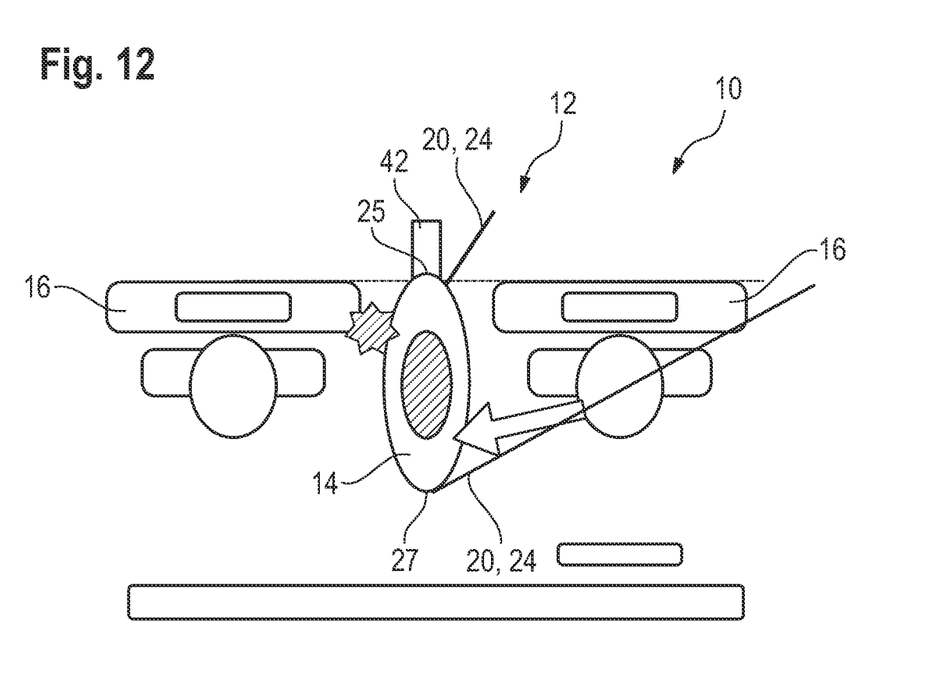
Figure 13:
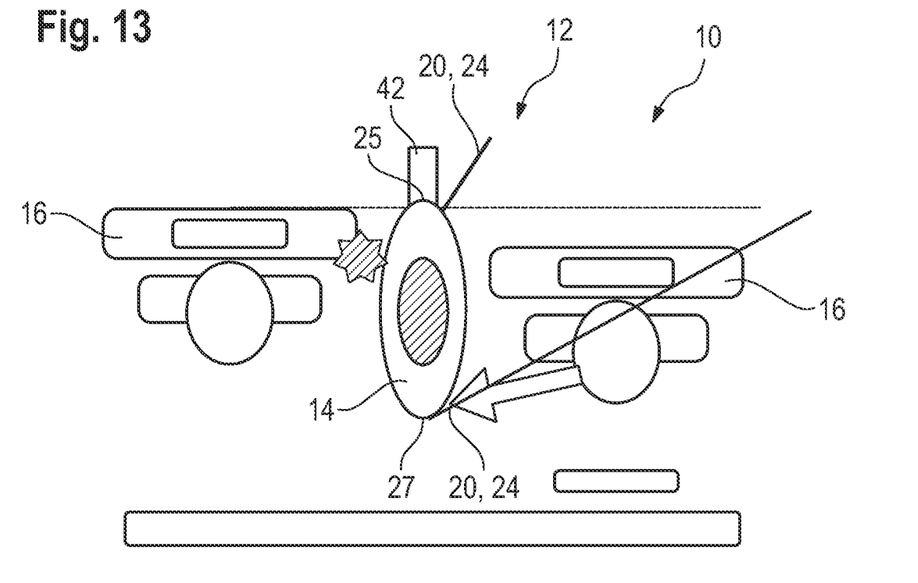

Each of the FIGS. 12 and 13 schematically illustrates another exemplary arrangement of the motor vehicle 10 according to the disclosure comprising a vehicle occupant restraint system 12 according to the disclosure. The motor vehicle 10 shown in FIGS. 12 and 13 is a motor vehicle 10 having a roof cutout, for example a motor vehicle 10 having a panoramic roof.

The vehicle occupant restraint system 12 according to FIGS. 12 and 13 differs from the vehicle occupant restraint system according to FIGS. 7 to 11 in that the tether 24 fastened to a front outer face of the airbag 14 extends rearward instead of forward in the longitudinal vehicle direction starting from the airbag 14. That is to say, in motor vehicles 10 having a roof cutout, it may be the case that the tether 24 cannot be fastened in the front area of the vehicle roof liner 18.

Basically, the two tethers 24 extend starting from the front end of the airbag 14 as well as starting from the rear end of the airbag 14, but always toward the same lateral vehicle side, especially the driver side.

This helps to prevent any rotation of the airbag 14 in the case of need.

Figure 14A:
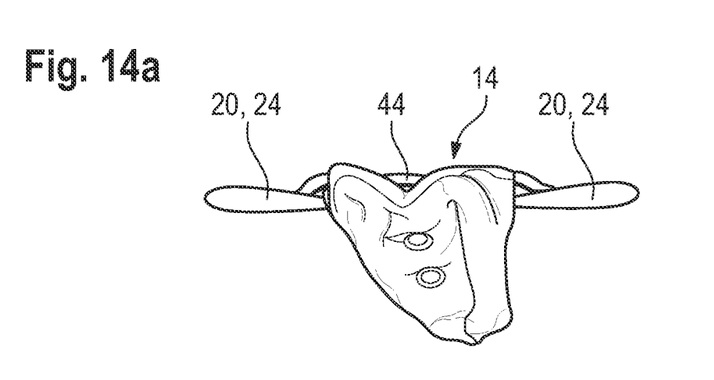
FIGS. 14a and 14b show an airbag fora vehicle occupant restraint system according to the disclosure.
Figure 14B:
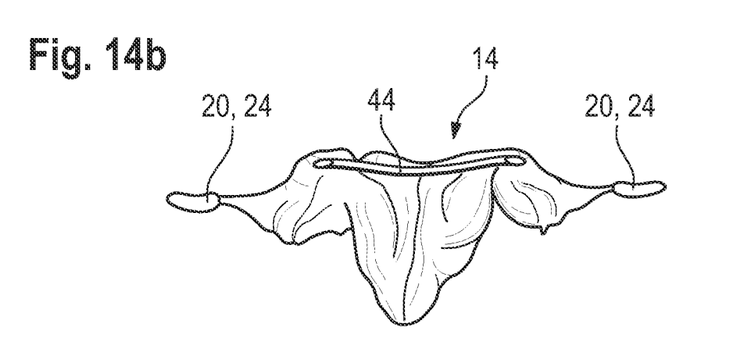
Figure 15:
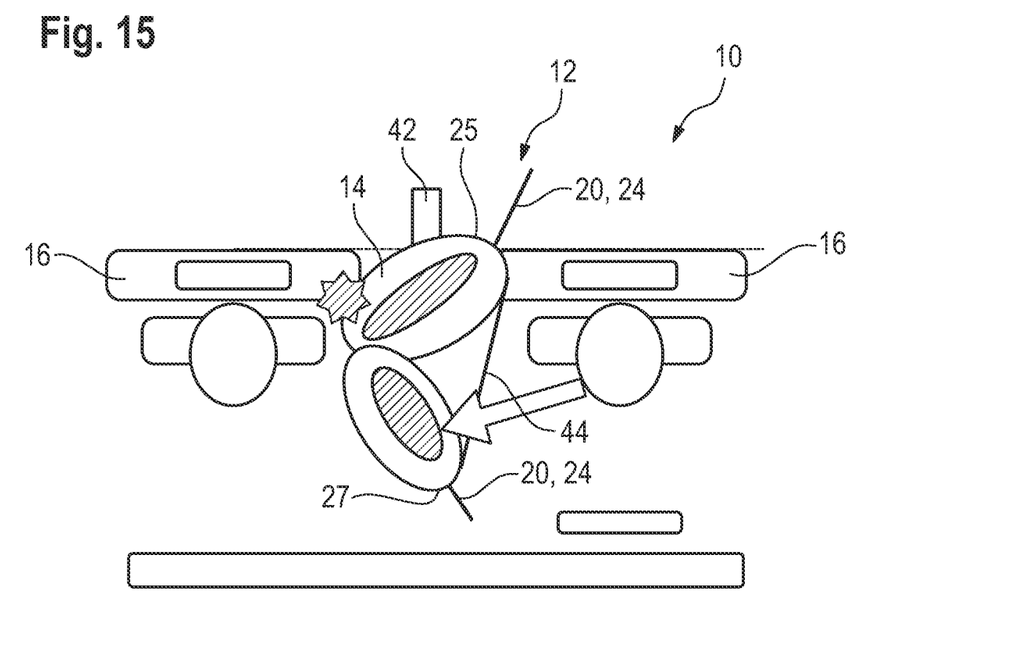
FIGS. 15 and 16 show an exemplary vehicle occupant restraint system according to the disclosure comprising an airbag according to FIGS. 14a and 14b, FIGS. 17 and 18 show another exemplary vehicle occupant restraint system according to the disclosure comprising an airbag according to FIGS. 14a and 14b, FIGS. 19 and 20 show another exemplary vehicle occupant restraint system according to the disclosure comprising an airbag according to FIGS. 14a and 14b, FIGS. 21 and 22 show another exemplary vehicle occupant restraint system according to the disclosure comprising an airbag according to FIGS. 14a and 14b.
Figure 16:
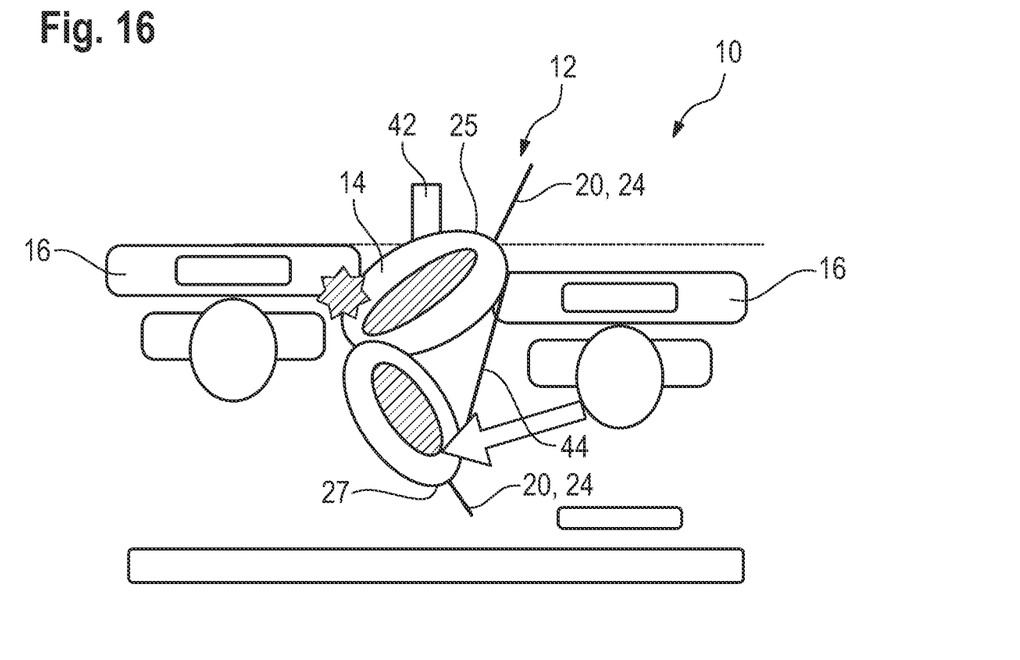
Figure 17:
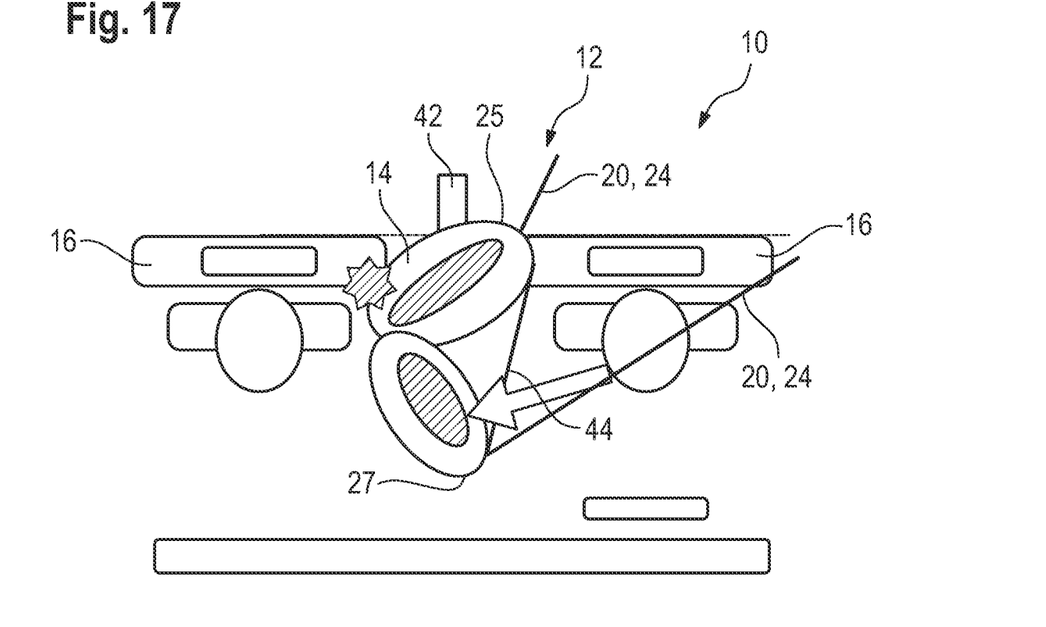
Figure 18:
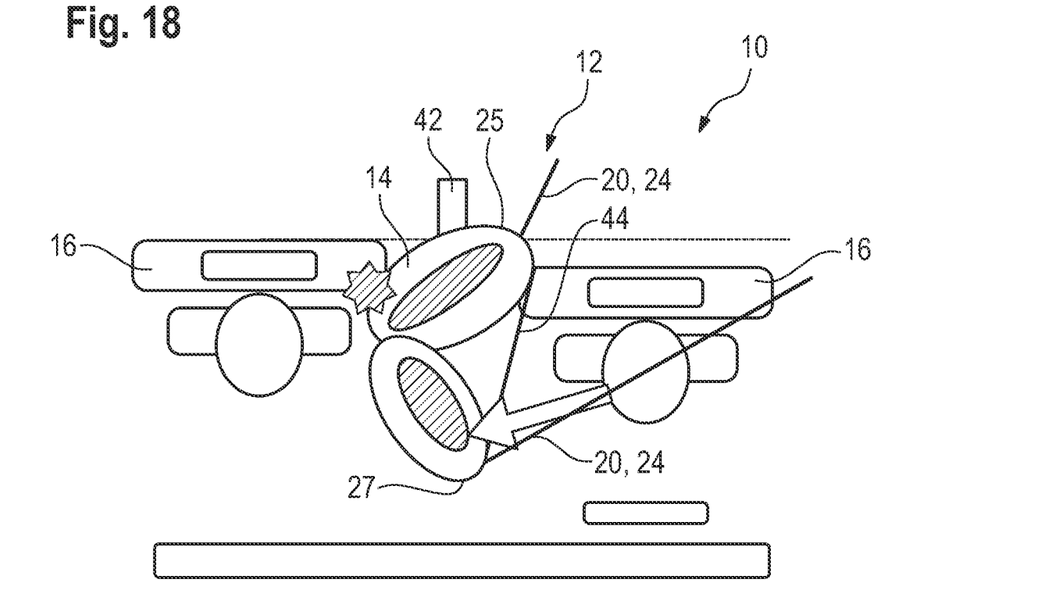

Each of the FIGS. 14a and 14b shows an airbag 14 of a vehicle occupant restraint system 12 according to the disclosure.

Apart from the tethers 24, the airbag 14 shown in FIGS. 14 and 14b includes a tensioning strap 44. Said tensioning strap 44 extends between a front end and a rear end of the airbag 14 in the longitudinal vehicle direction and by its ends is fastened to the airbag 14. Alternatively, the tensioning strap 44 may be fastened at the tethers 24.

The length of the tensioning strap 44 is designed so that the airbag 14 cannot fully deploy so that in the inflated state the airbag 14 is U-shaped or V-shaped in a top view, as is especially clearly shown in FIG. 14b. In other words, the tensioning strap 44 restricts deployment of the airbag 14.

In particular, the length of the airbag 14 in the longitudinal vehicle direction is shorter than the length of the tensioning strap 44.

Each of the FIGS. 15 to 18 schematically shows a motor vehicle 10 according to the disclosure comprising a vehicle occupant restraint system 12 according to the disclosure which includes the airbag 14 illustrated in FIGS. 14a and 14b.

The tensioning strap 44 of the airbag 14 is arranged on a side of the airbag 14 facing the driver.

Apart from the different airbag 14, the motor vehicle illustrated in FIGS. 15 to 18 is designed analogously to the motor vehicle 10 shown in FIGS. 10 to 13.

Each of the FIGS. 19 to 20 and 21 to 22 schematically illustrates another motor vehicle 10 according to the disclosure comprising a vehicle occupant restraint system 12 according to the disclosure.

Figure 19:
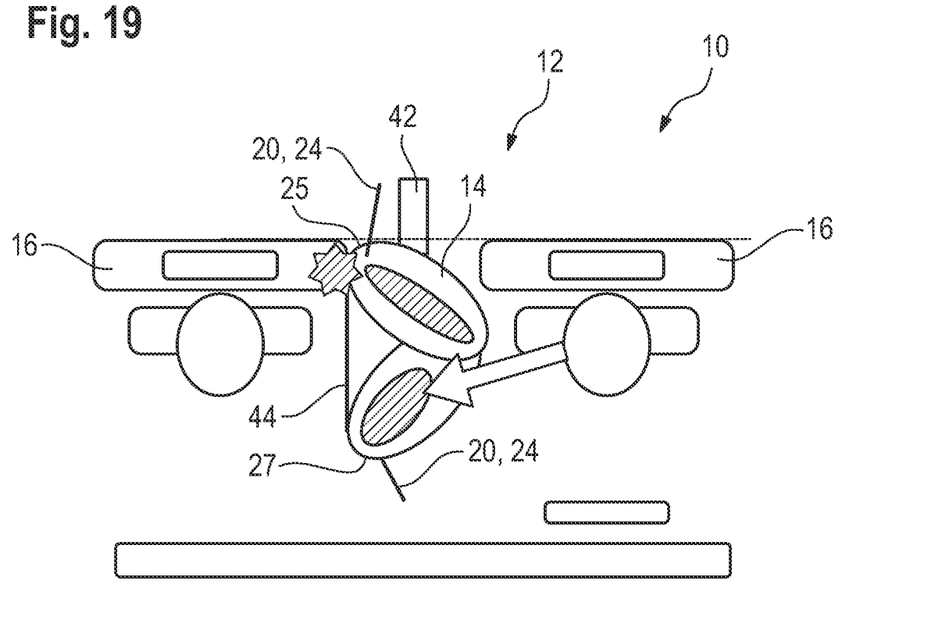
Figure 20:
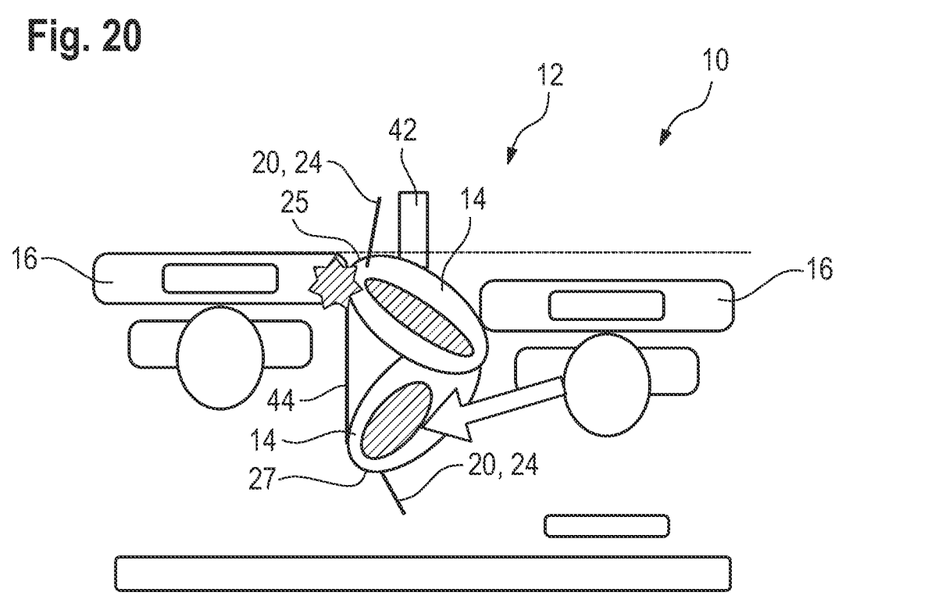

The vehicle occupant restraint system 12 illustrated in FIGS. 19 and 20 equally includes the airbag 14 shown in FIGS. 14a and 14b, however, the airbag 14 is differently oriented in this exemplary arrangement. Especially the tensioning strap 44 is disposed at an outer face of the airbag 14 facing away from the driver and facing the passenger. Apart from that, the exemplary arrangement of the vehicle occupant restraint system 12 illustrated in FIGS. 19 to 20 corresponds to the exemplary arrangement illustrated in FIGS. 15 to 16.

Figure 21:
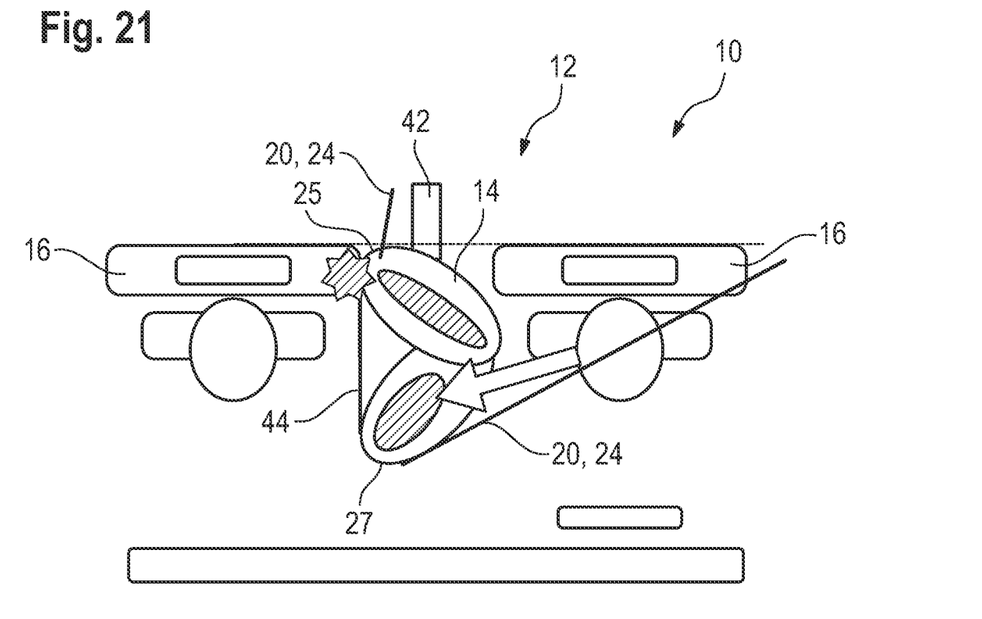
Figure 22:
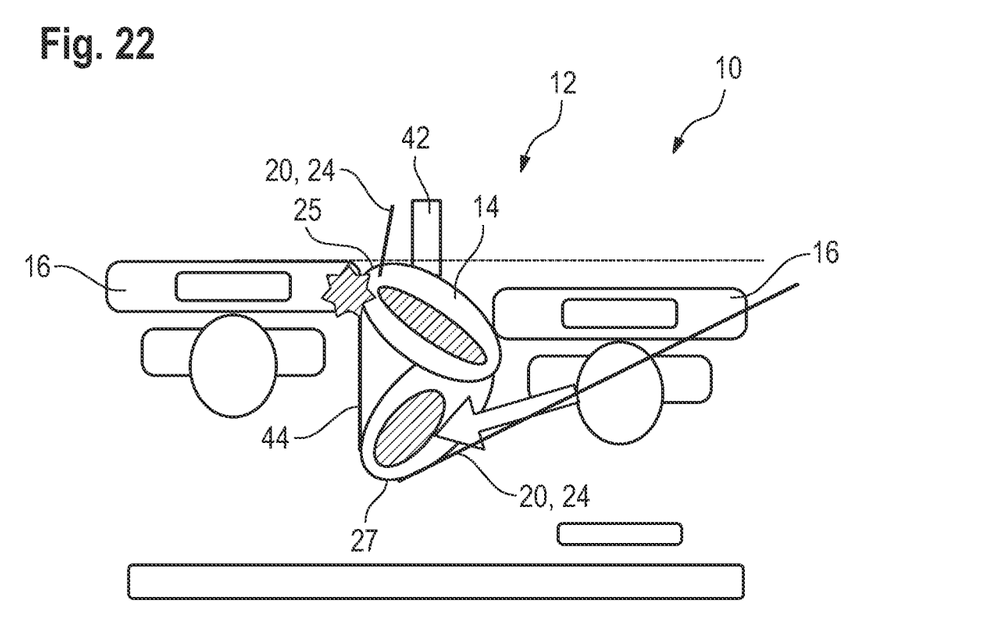

The exemplary arrangement illustrated in FIGS. 21 to 22 merely differs from the exemplary arrangement illustrated in FIGS. 19 to 20 in that a motor vehicle 10 having a roof cutout is concerned.

Figure 23:
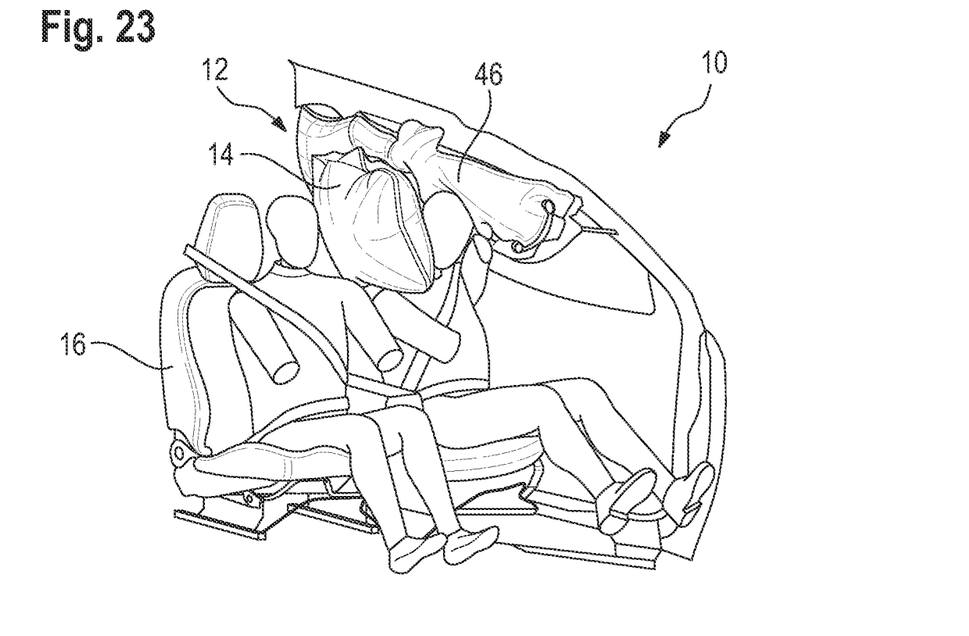
FIG. 23 shows another exemplary vehicle occupant restraint system according to the disclosure which additionally includes a side curtain airbag, and FIG. 24 exemplifies an airbag of 2D geometry.

FIG. 23 illustrates a motor vehicle 10 comprising another vehicle occupant restraint system 12 according to the disclosure. The vehicle occupant restraint system 12 in this case includes, in addition to the central airbag 14, a side curtain airbag 46 to support the vehicle occupant on both sides in the case of transverse displacement. Said side curtain airbag 46 may be optionally provided in all afore-described exemplary arrangements of the vehicle occupant restraint system 12.

Figure 24:
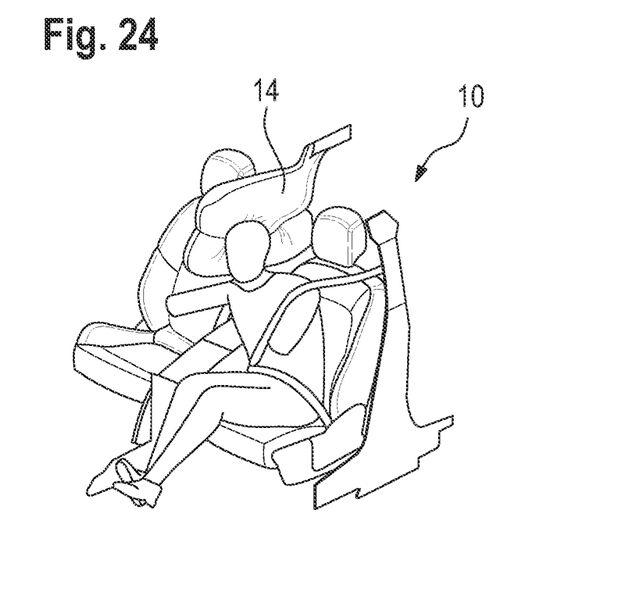

FIG. 24 exemplifies an airbag 14 of 2D geometry in a motor vehicle 10. An airbag 14 in such or similar shape is provided, for example, in a vehicle occupant restraint system 12 according to FIGS. 1 and 2 as well as 7 to 13. However, in FIG. 24 no holding arrangement 20 is illustrated.

The invention claimed is:

1. A vehicle occupant restraint system for a motor vehicle, comprising a central airbag installed in the area of a vehicle roof liner between two vehicle seats, wherein at least one holding arrangement is fastened by a first end to the airbag and by a second end to a vehicle structure such that the holding arrangement retains the airbag in an inflated state in a holding position in which the airbag can laterally support a vehicle occupant; wherein the airbag has two compartments which have different thicknesses in the inflated state, and wherein the airbag further includes a tensioning strap extending between a front end and a rear end of the airbag in a longitudinal vehicle direction and by its ends is fastened to the airbag, with a length of the tensioning strap being shorter than a length of the airbag in a longitudinal vehicle direction so that deployment of the airbag is restricted by the tension strap such that the two compartments of the airbag in the inflated state is U-shaped or V-shaped in a top view.

2. The vehicle occupant restraint system according to claim 1, wherein the at least one holding arrangement is suited to retain the airbag in the inflated state in a position in which a main extension plane of the airbag primarily extends in a vertical vehicle direction.

3. The vehicle occupant restraint system according to claim 1, wherein the at least one holding arrangement is a tether fastened by one end to the airbag and by another end to a vehicle structure.

4. The vehicle occupant restraint system according to claim 3, wherein the tether is connected to the airbag along a longitudinal seam extending, when viewed in a longitudinal vehicle direction, from a leading edge of the airbag to a trailing edge of the airbag.

5. The vehicle occupant restraint system according to claim 3, wherein two tethers are provided, wherein in the inflated state of the airbag one of the tethers is fastened, when viewed in a longitudinal vehicle direction, to a rear outer face of the airbag-and the other tether is fastened to an opposed front outer face of the airbag.

6. The vehicle occupant restraint system according to claim 1, wherein, at least at its two longitudinal edges, includes fasteners for fastening the airbag to the vehicle roof liner so that the airbag is U-shaped in the mounted inflated state.

7. The vehicle occupant restraint system according to claim 1, wherein a length of the airbag extending in a vertical vehicle direction in the inflated state is so long that the airbag is suited to laterally support a head of a vehicle occupant and at least a portion of a torso of the vehicle occupant.

8. The vehicle occupant restraint system according to claim 1, wherein a tether fastened on a rear outer face of the airbag extends rearward in a longitudinal vehicle direction starting from the airbag and another tether fastened on a front outer face of the airbag extends forward in the longitudinal vehicle direction starting from the airbag.

9. The vehicle occupant restraint system according to claim 1, wherein a tether fastened on a rear outer face of the airbag extends rearward in a longitudinal vehicle direction starting from the airbag and another tether fastened on a front outer face of the airbag extends rearward equally in a longitudinal vehicle direction starting from the airbag.

10. The vehicle occupant restraint system according to claim 1, wherein the vehicle occupant restraint system includes a side curtain airbag in addition to the airbag.

11. A vehicle comprising a vehicle occupant restraint system according to claim 1, wherein the motor vehicle includes two juxtaposed vehicle seats and the airbag in an inflated state is disposed as a central airbag between the two vehicle seats.

12. The vehicle occupant restraint system according to claim 1, wherein the at least one holding arrangement is suited to retain the airbag in the inflated state in a position in which a main extension plane of the airbag primarily extends in a longitudinal vehicle direction.

13. The vehicle occupant restraint system according to claim 1, wherein the at least one holding arrangement is suited to retain the airbag in the inflated state in a position in which a main extension plane of the airbag primarily extends in a vertical vehicle direction and a longitudinal vehicle direction.

14. A vehicle occupant restraint system for a motor vehicle, comprising a central airbag installed in the area of a vehicle roof liner between two vehicle seats, wherein a pair of tethers are provided, with a first tether being fastened by a first end to a rear outer face of the airbag such that the first tether extends rearward in a longitudinal vehicle direction starting from the airbag and wherein the first tether has a second end attached to a vehicle structure, and wherein a second tether is fastened on a front outer face of the airbag so as to extend forward in the longitudinal vehicle direction starting from the airbag such that the tether retains the airbag in an inflated state in a holding position in which the airbag can laterally support a vehicle occupant; and wherein the airbag includes a tensioning strap extending between a front end and a rear end of the airbag in a longitudinal vehicle direction and by its ends is fastened to each of the tethers, with a length of the tensioning strap being shorter than a length of the airbag in a longitudinal vehicle direction so that deployment of the airbag is restricted by the tensioning strap such that the airbag in the inflated state is U-shaped or V-shaped in a top view.

15. The vehicle occupant restraint system according to claim 14, wherein the vehicle occupant restraint system includes a side curtain airbag in addition to the airbag.

\* \* \* \* \*